(12) United States Patent
Jallais et al.

(10) Patent No.: US 8,813,772 B2
(45) Date of Patent: Aug. 26, 2014

(54) SECURITY DEVICE AND CONTAINER PROVIDED WITH SUCH DEVICE

(75) Inventors: Simon Jallais, Chaville (FR); Deborah Houssin, Milly-la-Foret (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 137 days.

(21) Appl. No.: 13/500,972

(22) PCT Filed: Sep. 22, 2010

(86) PCT No.: PCT/FR2010/051977
§ 371 (c)(1),
(2), (4) Date: Apr. 9, 2012

(87) PCT Pub. No.: WO2011/042635
PCT Pub. Date: Apr. 14, 2011

(65) Prior Publication Data
US 2012/0199593 A1 Aug. 9, 2012

(30) Foreign Application Priority Data

Oct. 9, 2009 (FR) ...................................... 09 57068

(51) Int. Cl.
*F16K 17/14* (2006.01)
*F16K 17/40* (2006.01)
(52) U.S. Cl.
USPC ...................... 137/68.23; 137/68.12; 137/74
(58) Field of Classification Search
USPC ................. 137/68.12, 72, 74, 79, 68.23, 605; 102/205, 206
See application file for complete search history.

(56) References Cited

U.S. PATENT DOCUMENTS

| | | | | |
|---|---|---|---|---|
| 5,518,032 A | * | 5/1996 | Berke | 137/899.4 |
| 6,142,346 A | * | 11/2000 | Aderholt et al. | 222/397 |
| 6,604,541 B1 | * | 8/2003 | Denning | 137/68.22 |
| 6,866,057 B1 | | 3/2005 | Buehrle, II | |

FOREIGN PATENT DOCUMENTS

| | | |
|---|---|---|
| FR | 1 148 511 | 12/1957 |
| GB | 2 286 804 | 8/1995 |

OTHER PUBLICATIONS

International Search Report for PCT/FR2010/051977, mailed Dec. 2, 2010.
French Search Report for FR 0957068, mailed May 7, 2010.

* cited by examiner

*Primary Examiner* — John Rivell
*Assistant Examiner* — Kevin Barss
(74) *Attorney, Agent, or Firm* — Christopher J. Cronin

(57) ABSTRACT

The invention relates to a security device forming a pressurized gas release valve, said device including a body that defines a gas flow channel extending between a first upstream end, to be placed in contact with a source of pressurized gas, and a second downstream end, to be placed in contact with the outer atmosphere, the device including a stopper that is located on the channel so as to prevent the flow of the gas between the upstream end and the downstream end in a normal situation, the stopper being fusible and/or frangible so as to release the gas passage in the event of a dangerous situation when a pressure and/or a temperature exceeds a predetermined threshold. Said device is characterized in that said device includes a tank of an unstable, exothermically decomposable gas that is placed in communication with the pressurized gas released during the melting/breaking of the stopper.

13 Claims, 1 Drawing Sheet

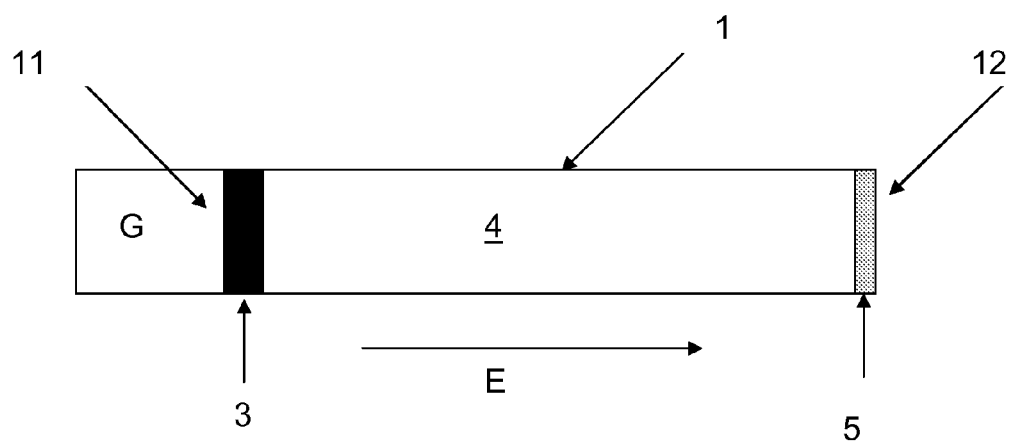

SECURITY DEVICE AND CONTAINER PROVIDED WITH SUCH DEVICE

CROSS-REFERENCE TO RELATED APPLICATIONS

This application is a §371 of International PCT Application PCT/FR2010/051977, filed Sep. 22, 2010, which claims §119(a) foreign priority to French patent application 0957068, filed Oct. 9, 2009.

BACKGROUND

1. Field of the Invention

The present invention relates to a safety device and to a container provided with such a device.

The invention relates, more particularly, to a safety device forming a valve for releasing a pressurized gas in a hazardous situation, comprising a body defining a gas flow channel extending between an upstream first end intended to be brought into contact with a source of pressurized gas and a downstream second end intended to be brought into contact with the external atmosphere, the device including a plug located on the channel to prevent the gas from flowing between the upstream end and the downstream end given a normal situation, the plug being meltable and/or frangible so as to free the passage for the gas in the event of a hazardous situation with the pressure and/or the temperature exceeding a predetermined threshold.

2. Related Art

Inflammable gas bottles, in particular for mobile hydrogen energy applications, are equipped with a device for emptying the gaseous contents of the bottle if it is in a fire situation so as in this way to prevent it from exploding. This relates in particular to composite bottles of type IV.

Such a device often includes a thermal fuse, that is to say a entactic metal that has to melt when exposed to the temperature of the fire so as to create a leak that empties the bottle and thus prevents it from exploding.

In many fire situations, when the fuse releases the gas (especially hydrogen), the gas ignites and creates a flame of relatively large length depending on the pressure characteristics of the gas and on the geometry of the discharge orifice.

Opening the fuse clearly allows the gas at risk to be discharged. However, under certain conditions the gas does not ignite spontaneously. The gas release may thus be mixed with the ambient air and form an inflammable cloud of relatively large volume, the explosion (or even detonation) of which may prove to be disastrous, in particular in confined and obstructed configurations (typically in an underground parking lot or a tunnel).

However, it is often preferable to form a flame (even of great length) since the associated (radiation) effects are judged to be less than those of a gas cloud exploding.

A known solution consists in choosing a geometry of the gas discharge orifice that favors spontaneous ignition of said gas.

SUMMARY OF THE INVENTION

The object of the present invention is to alleviate some or all of the drawbacks of the prior art mentioned above.

For this purpose, the device according to the invention which moreover conforms to the generic definition as given in the above preamble, is essentially characterized in that the device includes a reservoir of an unstable, exothermically decomposable gas which is brought into communication with the pressurized gas released when the plug melts/ruptures.

Moreover, embodiments of the invention may have one or more of the following features:

the reservoir of unstable gas is contained in a sealed volume located in the flow channel or located in a portion adjacent the channel and selectively in communication with said flow channel;

the reservoir of unstable gas is in fluidic contact with the plug;

the reservoir of unstable gas is contained in a sealed volume closed off by an impermeable rupture disk;

the reservoir of unstable gas is contained in a sealed volume of the channel between, on one side, the plug and, on the other side, an impermeable rupture disk in communication with the outside;

the unstable gas of the reservoir comprises at least one of the following: acetylene ($C_2H_2$), nitrous oxide ($N_2O$), nitrogen trichloride ($NCl_3$), ethylene oxide ($C_2H_4O$), hydrogen azide ($N_3H$), chlorine azide ($N_3Cl$), chlorine oxide ($Cl_2O$ or $ClO_2$), hydrazine ($N_2H_4$), and ozone ($O_3$);

the amount of unstable gas contained in the reservoir is between 0.1 $cm^3$ and 1 liter; and the pressure of the unstable gas of the reservoir is between 0.1 and 700 bar, preferably between 1 and 15 bar or even more preferably between 1 and 5 bar.

The invention also relates to a pressurized gas container comprising a device according to any one of the features above or below.

The invention may also relate to any alternative device or method comprising any combination of the features above or below.

Other particular features and advantages will become apparent on reading the description below, given with reference to the single FIGURE which shows, schematically and partially, an example of the structure and operation of a device according to the invention.

BRIEF DESCRIPTION OF THE FIGURES

The FIGURE is a schematic of the safety device of the invention.

DETAILED DESCRIPTION OF THE INVENTION

The safety device comprises a body defining a channel 1 for gas flow E, extending between an upstream first end 11 intended to be brought into contact with a source of pressurized gas G and a downstream second end 12 intended to be brought into contact with the external atmosphere.

The channel 1 is for example cylindrical.

A meltable plug 3 is placed on the channel 1 to prevent the gas from flowing between the upstream end 11 and downstream end 12 in a normal situation. The plug 3 is conventionally meltable and/or frangible so as to free the passage for the gas in the event of a hazardous situation when it is exposed to a pressure and/or a temperature exceeding a predetermined threshold.

According to an advantageous particular feature, the device comprises a reservoir 4 of unstable, exothermically decomposable gas. The unstable gas of the reservoir 4 is brought into communication with the pressurized gas G released when the plug 3 melts/ruptures.

For example, the reservoir 4 of unstable gas is contained in a sealed volume of the channel 1 between, on one side, the plug 3 and, on the other side, an impermeable rupture disk 5 in communication with the outside.

Preferably, the unstable gas is a pure gas that can decompose exothermically with the absence of air or of an oxidizer gas. This unstable gas has the property of releasing a large amount of heat and generating a high temperature when it is activated, such as, by an incident shock wave that expands the gas G released.

The unstable gas is for example acetylene ($C_2H_2$). Of course, the unstable gas may consist of any other gas or gas mixture, especially one of the following: nitrous oxide ($N_2O$), nitrogen trichloride ($NCl_3$), ethylene oxide ($C_2H_4O$), hydrogen azide (NH), chlorine azide ($N_3Cl$), chlorine oxide ($Cl_2O$ or $ClO_2$), hydrazine ($N_2H_4$), and ozone ($O_3$). It should be understood that this list is not exhaustive.

The instability of the reservoir 4 of unstable gas may also be increased by one of the following parameters: the concentration of the unstable gas, the pressure of the unstable gas, the temperature of the unstable gas and the material of the enclosure that contains this unstable gas.

The invention thus makes it possible to create a flame when discharging the gas (for example hydrogen) by decomposition of the unstable gas.

Considering the use of acetylene as unstable gas, when the plug 3 melts the hydrogen expands into the compartment containing the acetylene. This release is accompanied by a shock wave behind which the temperature rises for example to above 1000 K. At this temperature and owing to the effect of the local pressure, the acetylene decomposes highly exothermically. The heat of decomposition is expelled, after the disk 5 ruptures, to the outside and ignites the hydrogen discharged.

It may be stated that, while still having a simple and inexpensive structure, the invention does help to improve the safety conditions when an inflammable gas is released.

Advantageously, the invention applies to composite containers of type IV. Of course, the invention is also advantageously applicable to containers of type III and even to containers of type I and II.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An article of manufacture forming a safety valve for releasing a pressurized inflammable gas in a hazardous situation, comprising a body defining a gas flow channel extending between an upstream first end intended to be brought into contact with a source of pressurized inflammable gas and a downstream second end intended to be brought into contact with an external atmosphere, the article of manufacture including a plug located on the channel to normally prevent the inflammable gas from flowing between the upstream end and the downstream end, the plug being meltable and/or frangible so as to free the passage for the inflammable gas in the event of a hazardous situation with a pressure and/or the temperature of the pressurized inflammable gas exceeding a predetermined threshold so as to release the pressurized inflammable gas, characterized in that the article of manufacture includes a reservoir of an unstable, exothermically decomposable gas a release of which is adapted to ignite the released pressurized inflammable gas when the unstable gas is in fluid communication with the released pressurized inflammable gas, the reservoir and flow channel are adapted to bring the unstable gas into fluid communication with the released pressurized inflammable gas only when the plug melts/ruptures.

2. The article of manufacture of claim 1, wherein the reservoir of unstable gas is contained in a sealed volume located in the flow channel or located in a portion adjacent the channel and only in fluid communication with said flow channel when the plug melts/ruptures.

3. The article of manufacture of claim 1, wherein the reservoir of unstable gas is in fluidic contact with the plug.

4. The article of manufacture of claim 1, wherein the reservoir of unstable gas is contained in a sealed volume closed off by an impermeable rupture disk.

5. The article of manufacture of claim 1, wherein the reservoir of unstable gas is contained in a sealed volume of the channel between, on one side of the channel, the plug and, on another side of the channel, an impermeable rupture disk in communication with an ambient atmosphere.

6. The article of manufacture of claim 1, wherein the unstable gas of the reservoir comprises at least one of: acetylene ($C_2H_2$), nitrous oxide ($N_2O$), nitrogen trichloride ($NCl_3$), ethylene oxide ($C_2H_4O$), hydrogen azide ($N_3H$), chlorine azide ($N_3Cl$), chlorine oxide ($Cl_2O$ or $ClO_2$), hydrazine ($N_2H_4$), and ozone ($O_3$).

7. The article of manufacture of claim 1, wherein the amount of unstable gas contained in the reservoir is between 0.1 $cm^3$ and 1 liter.

8. The article of manufacture of claim 1, wherein a pressure of the unstable gas of the reservoir is between 0.1 and 700 bar.

9. The article of manufacture of claim 1, wherein a pressure of the unstable gas of the reservoir is between 1 and 15 bar.

10. The article of manufacture of claim 1, wherein a pressure of the unstable gas of the reservoir is between 1 and 5 bar.

11. A pressurized gas container containing an inflammable gas, wherein it comprises at least one article of manufacture in accordance with claim 1.

12. The pressurized gas container of claim 11, wherein the inflammable gas is hydrogen.

13. The pressurized gas container of claim 12, wherein the unstable gas comprises at least one of: acetylene ($C_2H_2$), nitrous oxide ($N_2O$), nitrogen trichloride ($NCl_3$), ethylene oxide ($C_2H_4O$), hydrogen azide ($N_3H$), chlorine azide ($N_3Cl$), chlorine oxide ($Cl_2O$ or $ClO_2$), hydrazine ($N_2H_4$), and ozone ($O_3$).

* * * * *